United States Patent
Jang

(10) Patent No.: US 7,458,290 B2
(45) Date of Patent: Dec. 2, 2008

(54) RACK AND PINION TYPE STEERING GEAR

(75) Inventor: Jae-Ho Jang, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 728 days.

(21) Appl. No.: 11/024,415

(22) Filed: Dec. 30, 2004

(65) Prior Publication Data

US 2006/0090581 A1   May 4, 2006

(51) Int. Cl.
*F16H 35/00* (2006.01)
(52) U.S. Cl. .................... 74/388 PS; 74/422
(58) Field of Classification Search .......... 74/388 PS, 74/89.11, 89.12, 422; 403/122–144
See application file for complete search history.

(56) References Cited

U.S. PATENT DOCUMENTS

| | | | |
|---|---|---|---|
| 3,414,302 A * | 12/1968 | Priest | 403/125 |
| 3,786,695 A * | 1/1974 | Barrett, Jr. | 74/586 |
| 3,820,908 A * | 6/1974 | Maxeinger et al. | 403/133 |
| 4,721,175 A | 1/1988 | Butler et al. | |
| 4,790,236 A * | 12/1988 | Macdonald et al. | 92/129 |
| 5,000,416 A * | 3/1991 | Fantasia | 248/650 |
| 5,413,031 A * | 5/1995 | Kohlmeyer | 92/165 R |
| 5,501,421 A * | 3/1996 | Kluting | 248/288.31 |
| 6,921,226 B2 * | 7/2005 | Rundle et al. | 403/77 |
| 7,258,034 B2 * | 8/2007 | Kim | 74/388 PS |
| 2005/0017472 A1 * | 1/2005 | Kondo et al. | 280/93.513 |

OTHER PUBLICATIONS

U.S. Appl. No. 10/649,860, filed Aug. 28, 2003.
U.S. Appl. No. 10/983,607, filed Nov. 9, 2004.

* cited by examiner

*Primary Examiner*—Richard W Ridley
*Assistant Examiner*—Phillip Johnson
(74) *Attorney, Agent, or Firm*—Greenblum & Bernstein, P.L.C.

(57) ABSTRACT

A rack and pinion type steering gear includes a pinion, a rack bar formed therein with a rack gear which is engaged with the pinion, a first tie rod and a second tie rod which are disposed in both right and left ends of the rack bar, and a first ball joint and a second ball joint that connect the rack bar with the two tie rods. The rack bar includes a sliding portion connected at one end to the first ball joint, a rack gear portion connected at one end to the second ball joint, a link disposed between the other end of the sliding portion and the other end of the rack gear portion, a third ball joint connecting the other end of the sliding portion with one end of the link, and a fourth ball joint connecting the other end of the rack gear portion with the other end of the link.

3 Claims, 3 Drawing Sheets

FIG. 1 <u>PRIOR ART</u> ured by the rack bush 140 mounted on the rack housing 70.

RACK AND PINION TYPE STEERING GEAR

RELATED APPLICATIONS

The present disclosure relates to subject matter contained in priority Korean Application No. 10-2004-0088594, filed on Nov. 03, 2004, which is herein expressly incorporated by reference in its entirety.

BACKGROUND OF THE INVENTION

1. Field of the Invention

The present invention relates to a rack and pinion type steering gear configured to a rack bar, which comprises a rack teeth portion, a link, and a sliding portion.

2. Description of the Related Art

A steering gear box is an interconnect mechanism which transforms rotation of the steering wheel to a linear translation by means of the rack-pinion mechanism. The linear translation of the rack steers the tires of the vehicle through a tie rod assembly and a knuckle.

FIG. 1 illustrates the prior art a rack and pinion type steering gear. As shown in FIG. 1, the rack and pinion type steering gear 10 comprises a pinion 20, a rack bar 30 having a rack teeth 35 engaged with the pinion 20, a first tie rod 40a and a second tie rod 40b disposed at both right and left ends of the rack bar 30, and a first ball joint 50a and a second ball joint 50b for connecting the rack bar 130 with the first and second tie rods 40a, 40b (Refer to U.S. Pat. No. 4,721,175).

The pinion 20 is formed at the end of a pinion shaft 25 which is connected to a steering shaft (not shown).

The Rack bar 30 is a long round rod for converting rotation of the pinion 20 into a linear translation, and is slidably inserted into a tube type rack housing 70. The rack housing 70 is fixed on a frame (not shown).

The first and second ball joints 50a and 50b are covered with bellows 60a and 60b. The bellows 60a and 60b are fixedly mounted on the tie rods 40a and 40b and the rack housing 70.

However, the above-described rack bar 30 linearly moves in an axial direction in the housing 70. Therefore, if the rack bar 30 has a deviation in straightness, or the housing 70 has a deviation in roundness, it is likely to have a friction problem that reduces a basic performance of the steering gear.

SUMMARY OF THE INVENTION

Therefore, the present invention has been made in view of the above problems occurring in the prior art, and it is an object of the present invention to provide a rack and pinion type steering gear, which reduces weight and also can maximally suppress friction effects by minimizing the sliding range of the rack bar.

To accomplish the above objects, according to the present invention, there is provided a rack and pinion type steering gear including a pinion, a rack bar formed with a rack teeth engaged with the pinion, a first tie rod and a second tie rod disposed in both right and left ends of the rack bar, and a first ball joint and a second ball joint that connect the rack bar with the two tie rods, wherein the rack bar comprises: a) a sliding portion connected at one end to the first ball joint; b) a rack teeth portion connected at the other end to the second ball joint; c) a link disposed between the other end of the sliding portion and one end of the teeth gear portion; d) a third ball joint connecting the other end of the sliding portion with one end of the link; and e) a fourth ball joint connecting one end of the rack teeth portion and the other end of the link.

Preferably, wherein the rack teeth portion is installed in a rack housing, bellows enclosing the fourth ball joint and the second ball joint are installed on both right and left ends of the rack housing, and the sliding portion is a ball joint support housing containing the first ball joint and the third ball joint, the ball joint support housing being installed in a guide portion.

On the other hand, the rack bar is installed in a rack housing, bellows enclosing the first ball joint and the second ball joint are installed at both right and left ends of the rack housing, and a rack bush guiding the sliding portion is installed in the rack housing.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now made in detail to the preferred embodiment of the present invention with reference to the attached drawings.

Figure 1:
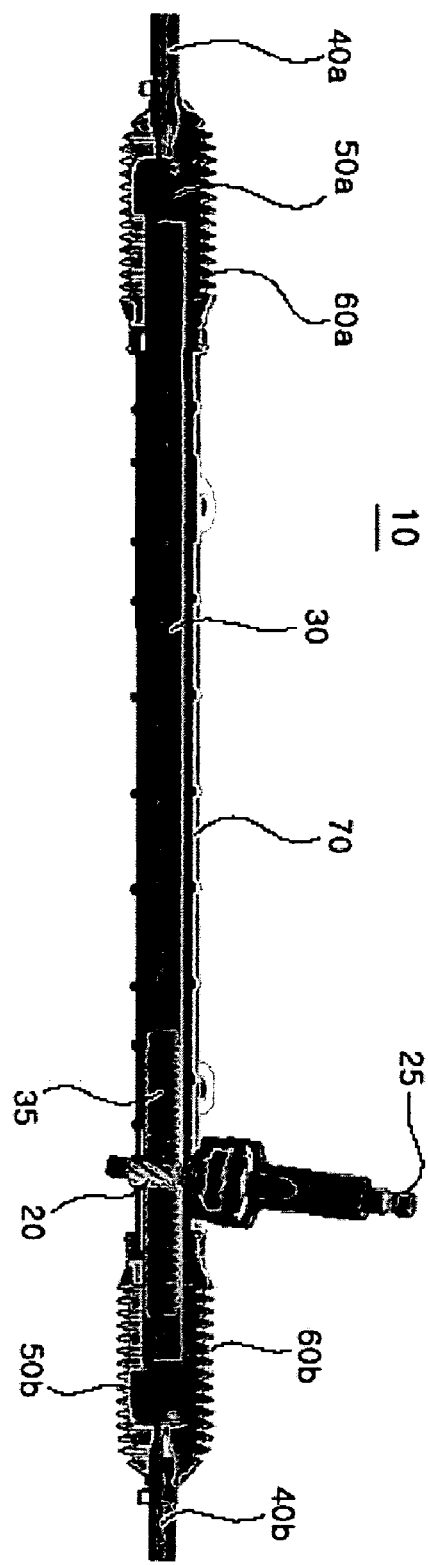
FIG. 1 illustrates a partial cross-section of the prior art rack and pinion type steering gear.
Figure 2:
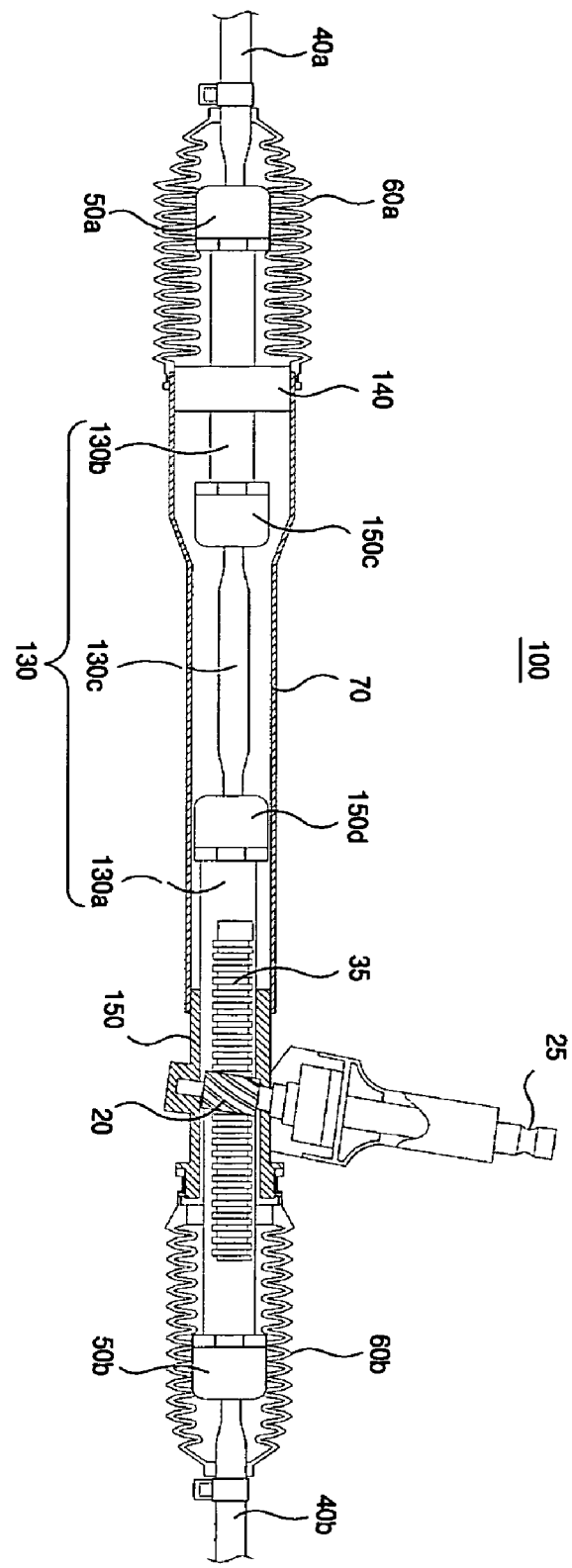
FIG. 2 illustrates a partial cross-section of a rack and pinion type steering gear according to one preferred embodiment of the invention.

FIG. 2 illustrates a partial cross section of a rack and pinion type steering gear according to one embodiment of the invention. As shown in FIG. 2, the rack and pinion type steering gear 100 of the first embodiment comprises a pinion 20 formed in a pinion shaft 25, a rack bar 130 formed with a rack teeth 35 which is engaged with the pinion 20, first and second tie rods 40a and 40b disposed at both right and left ends of the rack bar 130, and first and second ball joints 50a and 50b which connect the rack bar 130 with the first and second rods 40a and 40b.

In addition, the rack bar 130 is inserted into a tube type rack housing 70 such that it can slide in the housing 70. Two ball joints 50a and 50b are covered with bellows 60a and 60b, and the two bellows 60a and 60b are fixedly mounted on the two tie rods 40a and 40b and the rack housing 70.

The rack bar 130 is divided into 3 portions, dissimilar to the above described conventional rack bar 30. That is, the rack bar 130 comprises a rack teeth portion 130a, a sliding portion 130b, and a link 130c disposed between the rack teeth portion 130a and the sliding portion 130b. The link 130c is connected at one end to the other end of the sliding portion 130b by a third ball joint 150c, and is connected at the other end to one end of the rack teeth portion 130a by a fourth ball joint 150d. The rack teeth portion 130a is a round rod having a rack teeth 35 formed therein, and the sliding portion 130b is formed of a sliding rod. The sliding rod 130b is preferably slidably supported by a rack bush 140, mounted on the rack housing 70. The reference numeral 150 (not described) denotes a rack stopper 150, and the rack stopper 150 serves to close a gap between the rack bar and the rack housing, and also support the rack bush.

In this way, the rack bar 130 is divided into the rack teeth portion 130a and the sliding portion 130c so that it can be supported at a minimum length of the rack stroke only. The rack teeth portion 130a and the sliding portion 130b are connected by the link 130c having a relatively small diameter, so that a deviation in the straightness and/or the roundness thereof is significantly reduced, thereby minimizing a reduction in friction performance and also considerably reducing the weight of the rack bar 130.

Figure 3:
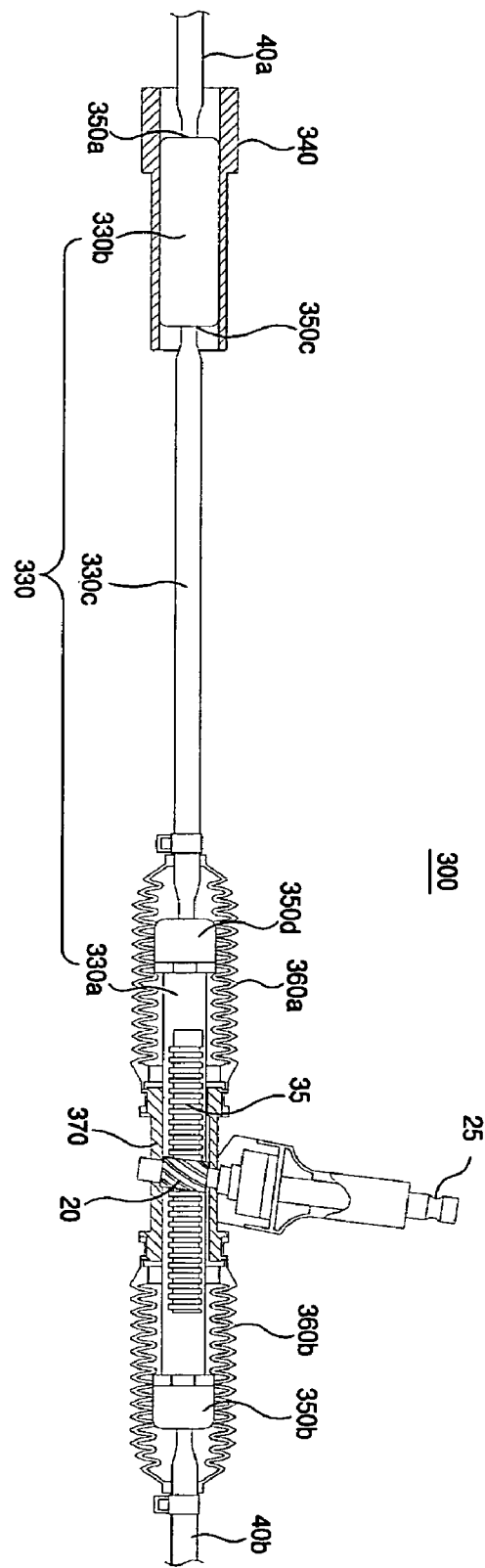
FIG. 3 illustrates a partial cross-sectional view of a rack and pinion type steering gear according to another preferred embodiment of the invention.

FIG. 3 illustrates a partial cross-section of a rack and pinion type steering gear according to another embodiment of the invention. As shown in FIG. 3, a rack bar 330 of the rack and pinion type steering gear 300, similar to the rack bar 130 of the previous embodiment, comprises a rack teeth portion 330a, a sliding portion 330b, and a link 330c disposed between the rack teeth portion 330a and the sliding portion 330b. The rack teeth portion 330a is connected to a tie rod 40b and the link 330c by a second ball joint 350b and a fourth ball joint 350d.

On the other hand, the sliding portion 330b, dissimilar to the sliding portion 130b in the previous embodiment, is formed of a ball joint support housing 330b including a first ball joint 350a and a third ball joint 350c, and the housing 330b is slidably supported by a guide portion 340.

Also, dissimilar to the rack housing 70 in the previous embodiment, the rack housing 370 slidably supports the rack teeth portion 330a. Consequently, the length of the rack housing 370 is significantly short, and thus a deviation in straightness and roundness is reduced accordingly so that efficiency drop by friction can be avoided.

As described above, according to the present invention, a link having a relatively small diameter embodies a portion of the rack bar to thereby minimize the rack stroke range, and thus a deviation in straightness and roundness is significantly reduced so that performance and efficiency drop by friction can be avoided.

Also, the total weight of the rack bar is considerably reduced by using a link having a smaller diameter.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A rack and pinion type steering gear, comprising:
   a pinion,
   a rack bar formed therein with rack teeth which are engaged with the pinion, the rack bar having first and second ends,
   a first tie rod and a second tie rod which are positioned within the first and second ends of the rack bar, respectively, and a first ball joint and a second ball joint that connect the rack bar with the first and second tie rods, wherein the rack bar comprises:
   a sliding portion connected at one end to the first ball joint;
   a rack teeth portion connected at the other end to the second ball joint;
   a link disposed between the other end of the sliding portion and one end of the rack teeth portion;
   a third ball joint connecting the other end of the sliding portion with one end of the link; and
   a fourth ball joint connecting one end of the rack teeth portion and the other end of the link, the first and third ball joints are positioned at the first end of the rack bar, and the second and fourth ball joints are positioned at the second end of the rack bar, and the rack teeth are positioned between the second and fourth ball joints.

2. A rack and pinion type steering gear according to claim 1, wherein the rack teeth portion is installed in a rack housing, bellows enclosing the fourth ball joint and the second ball joint are installed on both right and left ends of the rack housing, and the sliding portion is a ball joint support housing containing the first ball joint and the third ball joint, the ball joint support housing being installed in a guide portion.

3. The rack and pinion type steering gear according to claim 1, wherein the rack bar is installed in a rack housing, bellows enclosing the first ball joint and the second ball joint are installed at both right and left ends of the rack housing, and a rack bush for guiding the sliding portion is installed in the rack housing.

\* \* \* \* \*